US 8,496,902 B2

(12) United States Patent
Franger et al.

(10) Patent No.: US 8,496,902 B2
(45) Date of Patent: Jul. 30, 2013

(54) METHOD FOR PREPARING INSERTION COMPOUNDS OF AN ALKALI METAL, ACTIVE MATERIALS CONTAINING SAME, AND DEVICES COMPRISING SAID ACTIVE MATERIALS

(75) Inventors: Sylvain Franger, Gif-sur-Yvette (FR); Sébastien Martinet, Grenoble (FR); Frédéric Le Cras, Notre Dame de l'Osier (FR); Carole Bourbon, St. Michel de St-Geoirs (FR)

(73) Assignee: Commissariat a l'Energie Atomique, Paris (FR)

( * ) Notice: Subject to any disclaimer, the term of this patent is extended or adjusted under 35 U.S.C. 154(b) by 1788 days.

(21) Appl. No.: 10/537,947

(22) PCT Filed: Dec. 15, 2003

(86) PCT No.: PCT/FR03/50172
§ 371 (c)(1),
(2), (4) Date: Feb. 16, 2006

(87) PCT Pub. No.: WO2004/056702
PCT Pub. Date: Jul. 8, 2004

(65) Prior Publication Data
US 2006/0204848 A1    Sep. 14, 2006

(30) Foreign Application Priority Data
Dec. 16, 2002   (FR) .................................... 02 15915

(51) Int. Cl.
*C01B 25/26*   (2006.01)
(52) U.S. Cl.
USPC .......................................... 423/306; 423/312
(58) Field of Classification Search
USPC .......................................................... 423/306
See application file for complete search history.

(56) References Cited

U.S. PATENT DOCUMENTS

| | | | | |
|---|---|---|---|---|
| 6,645,675 | B1* | 11/2003 | Munshi ........................ | 429/305 |
| 2002/0192553 | A1* | 12/2002 | Barker et al. ................. | 429/224 |
| 2004/0013943 | A1* | 1/2004 | Stoker et al. ............. | 429/231.95 |
| 2004/0048157 | A1* | 3/2004 | Neudecker et al. ........ | 429/231.2 |

OTHER PUBLICATIONS

Bridson et al., "Synthesis and Crystal Structure of Maricite and Sodium Iron(III) Hydroxyphosphate," 1998, Chem. Mater., 10, pp. 763-768.*
Franger et al. "Comparison between different LiFePO$_4$ synthesis routes and their influence on its physico-chemical properties" *J. Power Sources* 119-121:252:257 (2003).

(Continued)

*Primary Examiner* — Melvin C Mayes
*Assistant Examiner* — Colin W Slifka
(74) *Attorney, Agent, or Firm* — McKenna Long & Aldridge, LLP

(57) ABSTRACT

Process for the preparation of an insertion compound of an alkali metal in which the following successive stages are carried out:
a) an organic complex of a transition metal or of a mixture of transition metals M in an oxidation state of greater than 2 is brought into contact with an alkali metal A in the ionic form and with an entity of formula $H_b(XO_4)$, where X is chosen from Si, S, Al, P, Ge, As or Mo and b has a value from 0 to 5, in a liquid medium in a closed chamber; the chamber is brought to a temperature T which makes possible the decomposition of the organic complex in the said liquid medium;
the temperature and the pressure in the chamber are brought back to ambient temperature and atmospheric pressure and the insertion compound for an alkali metal of formula $AMXO_4$, in which M is in the +2 oxidation state, is recovered.

20 Claims, 1 Drawing Sheet

OTHER PUBLICATIONS

Yamada et al. "Optimized LiFePO$_4$ for Lithium battery Cathodes" *J. Electrochemical Society* 148(3):A224-A229 (2001).

Yang et al. "Hydrothermal synthesis of lithium iron phosphate cathodes" *Electrochemistry Comm.* 3:505-508 (2001).

* cited by examiner

METHOD FOR PREPARING INSERTION COMPOUNDS OF AN ALKALI METAL, ACTIVE MATERIALS CONTAINING SAME, AND DEVICES COMPRISING SAID ACTIVE MATERIALS

This application is a national phase application of PCT Application No. PCT/FR2003/050172 filed on Dec. 15, 2003, which claims the benefit of French Patent Application No. 02 125915 filed on Dec. 16, 2002, which are both hereby incorporated by reference.

The present invention relates to a process for the preparation of insertion compounds of an alkali metal ion, such as the lithium ion, most specifically of insertion compounds of an alkali metal ion with a polyanionic structure.

The invention also relates to the insertion compounds, in particular lithium insertion compounds, thus obtained.

The invention relates in addition to the active materials comprising said insertion compounds, such as positive electrode active materials.

Finally, the invention relates to the devices comprising said compounds and/or active materials, such as, for example, electrochromic devices and batteries.

Lithium batteries are increasingly used as autonomous energy sources, in particular in portable devices, such as computers, telephones, personal assistants, camcorders, and the like, where they are tending to gradually replace nickel-cadmium (NiCd) and nickel-metal hydride (NiMH) batteries. This development results from the fact that the performance of lithium batteries in terms of energy density (Wh/kg, Wh/l) is far superior to that of the two types mentioned above.

The electrode active compounds used in these batteries are mainly $LiCoO_2$, $LiNiO_2$ and $LiMn_2O_4$ for the positive electrode and carbon, such as graphite or coke, and the like, for the negative electrode. The theoretical and practical capacities of these compounds are respectively 275 mAh/g and 140 mAh/g for $LiCoO_2$ and $LiNiO_2$ and 148 mAh/g and 120 mAh/g for $LiMn_2O_4$, for an operating voltage with respect to the lithium metal of approximately 4 volts.

The majority of battery systems currently available commercially thus use the $LiCoO_2/C$ pair but numerous problems of cost and of toxicity arise which are related to the element cobalt and problems of intrinsic safety of the system arise related to the instability and/or the reactivity of $Li_{1-x}CO_xO_2$ with respect to the electrolyte used.

In the same way, nickel oxides present major difficulties, again due to their high toxicity.

Manganese oxides, for their part, and particularly the family with the spinel structure $Li_{1+x}Mn_{2-x}O_4$ ($0 \leq x \leq 0.33$), are able to demonstrate electrochemical performances comparable with those of cobalt and nickel oxides. It is also apparent that the greater natural abundance of manganese and the lower toxicity of its oxides in comparison with cobalt and nickel are an important advantage for their wide use in batteries.

In the specific case of $LiMn_2O_4$, it is nevertheless established that its combined use with electrolytes formulated for operation in the vicinity of 4 volts with respect to lithium metal which comprise lithium hexafluorophosphate results in a gradual dissolution of the manganese oxide and consequently in a shorter lifetime of the battery.

Two families of compounds used for electrochemical reactions are, on the one hand, the family isotypic with olivine and, on the other hand, the Nasicon family; it should be remembered that the name Nasicon means sodium (Na) superionic conductor and that this compound corresponds to the formula $Na_xM_2X_3O_{12}$. These two families are composed of equivalent elements and differ only in the polyanions number/lithium number ratio and in their crystalline structure. This is because the family isotypic with olivine has an orthorhombic crystal unit cell and the family isotypic with Nasicon of formula $A_xM_2X_3O_{12}$ has a rhombohedral unit cell.

Materials with a structure isotypic with olivine with an orthorhombic crystal unit cell, such as $Li_{1-x}Fe_xPO_4$, for example $LiFePO_4$ (triphylite), have the advantage of being potentially inexpensive and nontoxic. In the case of $LiFePO_4$, the insertion/extraction of lithium takes place according to a two-phase process at 3.45 V/$Li^+$/Li, which renders this compound stable in virtually all organic solvents. Furthermore, it proves to be much more stable in the charged state ("$FePO_4$") in the presence of electrolyte than the oxides mentioned above, resulting in great operating safety in the batteries.

However, the major problem with this family of compounds is their low electronic and ionic conductivities at ambient temperature. Thus, this limits the kinetics of insertion/removal of lithium within the host structure and the use of these compounds to relatively low charging/discharging rates.

Furthermore, the compounds with the Nasicon structure, that is to say of formula $A_xM_2(XO_4)_3$ where A is an alkali metal, M is a transition metal and X represents Si, P, S, Mo or Ge, are also advantageous as positive electrode active material, in particular by virtue of their high ionic conductivity for lithium ions. However, just like the compounds with an olivine structure, they are poor electronic conductors, which limits their use.

In addition, due to their poor electrochemical kinetics, the compounds of the olivine family, such as $LiFePO_4$, cannot be used as active materials in an electrochromic device.

Historically and in the literature, for example in the document by A. Yamada et al., "Optimized $LiFePO_4$ for lithium battery cathodes", Journal of the Electrochemical Society, 148(3), A224-A229 (2001), and in the document by S. Yang et al., "Hydrothermal synthesis of lithium iron phosphate cathodes", Electrochemistry Communications, 3(2001), 505-508, the synthesis processes which make it possible, generally, to obtain the compounds of formula $LiMXO_4$ in which M represents a transition metal or a mixture of transition metals and X represents P, Si, S, Al, Ge or As, and the like, are processes using reactants exclusively in the solid state and involving high temperatures, namely generally greater than 600° C.

There are numerous drawbacks to these processes, equally as regards the reactants used, the conditions under which they are employed and the products obtained.

Thus, the reactants used in these synthesis processes, such as $Li_2CO_3$, $(NH_4)_a(XO_4)_b$ and the $M^{2+}$ salts of the metal, have several disadvantages: they give off harmful gases, such as $NO_x$ and $NH_3$, during their thermal decomposition and they require the use of an inert atmosphere, for example of argon or of nitrogen, in particular when M=Fe, in order to retain the degree of oxidation (+II), which places considerable restrictions on the handling thereof.

The synthesis is lengthy (its duration can exceed 24 hours) and is carried out under conditions which may be described as harsh, in particular with regard to the temperature, which is extremely high. In addition, toxic byproducts can be formed during the synthesis.

Finally, these processes, referred to as "all solid synthesis processes", result in final products, for example $LiFePO_4$, in the form of particles with a morphology which is certainly not homogeneous, with regard to their shape and with regard to their size, as is shown in FIG. 1, where $LiFePO_4$ agglomerates are clearly visible.

This heterogeneity in the morphology of the product means that its properties, as cathode material, are not good and that consequently the performances of the batteries in which these compounds are employed are not satisfactory.

Furthermore, the compounds synthesized by the processes of the prior art are not of high purity and they often require an additional stage of purification before they are used, for example before they are incorporated into the positive electrode of a battery.

In particular in the case of $LiFePO_4$, the compounds obtained by the "all solid" synthesis route result in high contents of $Fe^{3+}$ harmful to the specific capacity of the material.

The non-homogeneity of the particles necessarily results in a dispersion in response of the particles, which presents problems in managing the state of charge of the batteries.

The presence of the impurity $Fe^{3+}$ is harmful to the capacity, since only $Fe^{2+}$ participates in the electrochemical reaction.

A need thus exists for a process for the preparation of an insertion compound for an alkali metal which is simple, fast, safe, reliable, "clean" and inexpensive, which employs non-toxic starting materials and which does not generate very much in the way of byproducts and waste products which are possibly harmful.

There also exists a need for a process for the preparation of insertion compounds for an alkali metal which gives final products of high purity and with a perfectly controlled and homogeneous morphology, which exhibit excellent properties of electrochemical kinetics and high electronic and ionic conductivities, and which can be used at high charging/discharging rates.

In other words, there exists a need for an insertion compound for an alkali metal, such as lithium, which gives excellent results in terms of chemical reaction and which consequently has excellent properties as cathode material in a battery.

These properties have to go hand in hand, in particular, with a low cost, a low toxicity and high stability in organic solvents and electrolytes, making possible the use of these insertion compounds over a long period of time and with high reliability in devices such as batteries and electrochromic devices.

The aim of the present invention is to provide a process for the preparation of an insertion compound for an alkali metal, such as lithium, which meets the requirements indicated above.

The aim of the present invention is also to provide a process for the preparation of an insertion compound for an alkali metal, such as lithium, which does not exhibit the disadvantages, failings, limitations and inconveniences of the processes of the prior art and which solves the problems of the processes of the prior art.

This aim and still others are achieved, in accordance with the invention, by a process for the preparation of an insertion compound of an alkali metal in which the following successive stages are carried out:

a) an organic complex of a transition metal or of a mixture of transition metals M in an oxidation state of greater than 2 is brought into contact with an alkali metal A in the ionic form, and with an entity of formula $H_b(XO_4)$, where X is chosen from Si, S, Al, P, Ge, As or Mo and b has a value from 0 to 5, in a liquid medium in a closed chamber; the chamber is brought to a temperature T which makes possible the decomposition of the organic complex in said liquid medium;

b) the temperature and the pressure in the chamber are brought back to ambient temperature and atmospheric pressure and the insertion compound of an alkali metal of formula $AMXO_4$, in which M is in the +2 oxidation state, is recovered.

The process according to the invention comprises a specific sequence of specific stages.

The process according to the invention is fundamentally different from the processes of the prior art, both as regards the nature of each of the stages and their sequence.

In the process according to the invention, the synthesis is carried out in a liquid medium, whereas, in the processes of the prior art, the synthesis is carried out by bringing the solid reactants into contact.

In addition, the process according to the invention employs an organic complex in which the metal is in a specific oxidation state of greater than II, for example equal to 3 (III).

The process according to the invention uses, for the synthesis, inexpensive starting materials which are readily available commercially.

These reactants are not toxic. They do not give off harmful gases and, for this reason, it is not necessary to provide an inert argon or nitrogen atmosphere, with all the constraints which this imposes.

This advantage, essentially related to the fact that, in the specific organic complex employed according to the invention, the metal M is already at a degree of oxidation preferably equal to III and not at a degree of oxidation of II, as in the prior art, is particularly demonstrated in the case where M=Fe.

According to the invention, the organic part of the complex, also referred to as precursor of M (for example, precursor of Fe), decomposes under the effect of the temperature and releases highly reducing entities which will quantitatively convert all the metal M, initially at an oxidation state of greater than III, for example equal to III, to an oxidation state equal to II; the metal in this state can then react with an alkali metal in the ionic form present in the chamber to give the final compound $AMXO_4$, for example $LiMXO_4$.

The process according to the invention is fast; by way of example, it generally lasts only from 2 to 3 hours, whereas the processes for synthesis by the solid route of the prior art generally last more than 24 hours.

The process according to the invention is a clean process which, in addition to the use of non-toxic starting materials, does not generate toxic byproducts.

The process according to the invention gives a final product of high purity, greater than the purity of the materials of the prior art. For this reason, the compounds according to the invention do not require any additional purification stage before their use, for example before they are incorporated in the positive electrode material of a battery.

The compound obtained exhibits, by virtue of its preparation process, a fully controlled morphology with regard to the size and with regard to the shape of the particles constituting it. The particles are preferably homogenous in shape and in size, in contrast to the particles prepared by the processes of the prior art, in particular by "all solid" synthesis, which are certainly not homogeneous, which are "non-homogeneous".

This control of the morphology, this homogeneity in the size and in the shape, result in excellent performances as regards the power, the stability and the safety for the batteries in which the compounds of the invention are incorporated.

The invention additionally relates to an insertion compound of an alkali metal of formula $AM(XO_4)$ where A is chosen from alkali metals, X is chosen from Si, S, Al, P, Ge and Mo, and M is in the +2 oxidation state, characterized in that it exhibits a content of metal M at an oxidation state of greater than 2, for example of metal M(III), of less than 5% by weight, preferably of less than 1% by weight.

The invention also relates to an electrode active material comprising the material according to the invention or prepared by the process according to the invention.

The invention also relates to a positive electrode comprising said active material, to the battery comprising the said electrode and to an electrochromic device comprising the compound according to the invention or prepared by the process according to the invention.

The invention will be better understood on reading the detailed description which will follow, given by way of illustration and without limitation, and made with reference to the appended drawings, in which.

Figure 1:
FIG. 1 is a microphotograph, produced using a scanning electron microscope, of $LiFePO_4$ particles prepared by an "all solid" synthesis process of the prior art at high temperature (600° C.)

In a detailed way, the process according to the invention comprises, in an essential stage a), bringing an organic complex of a transition metal or of a mixture of transition metals M in an oxidation state of greater than 2 into contact with an alkali metal A in the ionic form and with an entity $H_b(XO_4)$, where X is chosen from Si, S, Al, Ge, As and Mo, and b has a value from 0 to 5, in a liquid medium in a closed chamber.

The alkali metal A is advantageously chosen from Li and Na. It is preferably introduced in the form of an alkali metal salt of formula $A_aH_b(XO_4)$, where a has a value from 1 to 5, for example 2. Preferably, X is P. A preferred alkali metal salt $A_aH_b(XO_4)$ is $Li_2HPO_4$.

The oxidation state of the metal M is advantageously from 3 to 5.

Preferably, the oxidation state of the metal M is equal to 3 (III).

The metal M is advantageously chosen from transition metals, such as Mn, Fe, Ni, Co, and the like, and their mixtures.

The term "organic complex" is understood to mean a compound in which the metal M is bonded, for example via a covalent, ionic or coordination bond, to at least one organic ligand. This organic complex is also referred to as precursor of the metal M.

Advantageously, according to the invention, said ligand is chosen from organic compounds of formula:

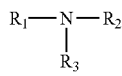

that is to say, form organic compounds comprising a nitrile functional group. In the above formula, at least one from $R_1$, $R_2$ and $R_3$ comprises at least one oxygen atom.

$R_1$, $R_2$ and $R_3$ are chosen independently from carboxy-(1-4C) alkyl radicals, for example carboxymethyl, carboxyethyl, and the like.

A preferred example of said ligand is nitrilotriacetic acid of formula $N(CH_2CO_2H)_3$ or ethylenedioxyethylenedinitriletetraacetic acid (known as EGTA).

Said organic complex is preferably prepared in a stage prior to stage a) by bringing a salt of the metal M, in the oxidation state of greater than 2, into contact with an organic compound in a liquid medium.

Said organic compound preferably corresponds to the formula:

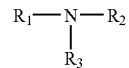

described above.

The metal salt is advantageously a metal(III) salt and the said metal is preferably iron. The salt can be chosen from sulphates, nitrates, chlorides, acetates, citrates, carboxylates, and the like, of the metal M. It can advantageously be iron (III) sulphate.

The operation in which the organic compound and the metal M salt are brought into contact is carried out in a liquid medium, after the fashion of stage a) of the process of the invention. For this reason, if the process according to the invention additionally comprises this preliminary stage of preparation of the organic complex, the entire process will still be carried out in a liquid medium with all the advantages presented by such a method of synthesis in comparison with the processes operating by the solid route.

The liquid medium for the synthesis of the organic complex is chosen from water; organic solvents, such as liquid alkanes, for example dodecane, or tributyl phosphate (TPB); and their mixtures.

The operation in which the metal salt and the organic compound are brought into contact is generally carried out at a temperature sufficient to produce the decomposition of the complex and the creation of reducing radicals.

For example, an aqueous solution of the metal salt, for example of iron (III) sulphate, is brought to reflux for at least one hour in the presence of the compound, an organic agent carrying a nitrile functional group and comprising at least one oxygen atom, such as nitrilotriacetic acid.

On conclusion of the reaction, the metal organic complex, for example metal (III) organic complex, generally obtained in the form of a precipitate, is recovered and is generally washed and dried.

In stage a), the organic complex, whether or not prepared during the optional preliminary stage described above, is brought into contact generally with an alkali metal salt, such as a lithium salt $Li_aH_b(XO_4)$, for example $Li_2HPO_4$.

This contacting operation takes place in a liquid medium. Said liquid medium is generally the same as that used for the optional preliminary stage of synthesis of the organic complex.

This contacting operation is carried out in a closed chamber, in a shut vessel, for example in a hermetically sealed reactor, or autoclave.

Solvothermal conditions (hydrothermal conditions in the case where the solvent is water) are applied to the reaction medium, that is to say that the operating temperature is greater than the boiling point of the solvent. The temperature is a temperature which makes possible the decomposition of the complex in the liquid medium and, as a result of the chamber being closed, the pressure is not controlled and is deduced from the relationship PV=nRT. In the case where the medium is water, the pressure in the autoclave is set by the steam (P/T state diagram of water) and reaches the value of 20 bar at the set temperature of 200° C.

The contacting operation generally takes place with stirring.

Heating is continued for a period of time of 1 to 10 hours, during which the pressure and the temperature described above are maintained. At the end of this period, stirring and heating are halted and the temperature and the pressure in the chamber (the temperature of the mixture) are brought back to ambient temperature and atmospheric pressure.

It should be noted that, advantageously according to the invention, the morphology of the final material obtained, that is to say its size and its shape, can be adjusted according to the cooling conditions: thus, slow cooling with a cooling rate, for example, of 0.5 to 2° C./min will generally result in particles of final product with a size of 20 to 40 µm.

Once the mixture (the reactor) has returned to ambient temperature and to atmospheric pressure, the chamber (the reactor) is opened and the final product, which is a solid and which is generally present in the form of particles, for example of a powder, generally precipitated at the bottom of the reactor, is recovered.

Recovery is carried out, for example, by filtration or sedimentation.

The product recovered on conclusion of stage b) is subsequently generally washed, for example with deionized water, and then dried, optionally under vacuum, generally at a temperature of 80 to 150° C.

The final product, which is an insertion compound for an alkali metal, corresponds to the formula $AMXO_4$, where A, M and X have already been defined above. The formula $AMXO_4$ is an overall formula which simply reflects the fact that this synthesis results in the formation of a mixed polyanionic compound of alkali metals and of transition metals. This compound with a polyanionic backbone belongs to the families of the phosphates, silicates, molybdenates, germanates, sulphates or their mixtures.

The insertion compound for an alkali metal according to the invention is a product of high purity, in contrast to the similar products obtained by processes of the prior art. This purity is shown, for example, by the powder X-ray diffraction diagram, which exhibits no subsidiary peak, whatever the method of cooling used.

This purity is also demonstrated by the other physico-chemical analyses, such as redox titration and elemental analysis.

The compound according to the invention has a content of metal M at an oxidation state of greater than 2 (II), which is an impurity, for example a content of metal M (III), such as Fe (III), of less than 5% by weight, preferably of less than 1%.

This high purity is fundamentally related to the specific characteristics of the process according to the invention.

The product according to the invention is generally present in the form of particles which may also be referred to as grains, the particles having, for example, the shape of cylinders, cubes or polyhedra. The size of these particles or grains is defined, according to their geometry, by their most characteristic or most representative dimension. Thus, for particles in the shape of a cylinder, the size will be defined by their diameter or their length. These combined particles can be defined as forming a powder.

The particles of the compound according to the invention have, as has been seen, a variable size which is fully controlled by virtue of the adjustment of the cooling rate and/or of the profile of the latter. This size, for example the diameter in the case of cylindrical particles, is from 0.1 to 50 µm.

The particles of the compounds according to the invention, as a result of the characteristics of the process, have a fully controlled morphology and are homogeneous, both with regard to their shape and with regard to their size.

This means that, for a certain amount of particles, the particles which deviate from the mean desired shape are in a very low proportion, for example of less than 20%, preferably of less than 10%, by observation using an SEM.

It may also be indicated that the particles according to the invention, in contrast to the particles prepared by the processes of the prior art (see, for example FIG. 1), do not exhibit agglomerates.

The particles are also homogeneous as regards the size, that is to say that, if the distribution in the size of the grains obtained on conclusion of the process for a given synthesis is considered, the deviation from the mean value of the size of the particles is generally less than 20%, preferably less than 10%, more preferably less than 1%.

In addition, the invention relates to electrode active materials, in particular positive electrode active materials, comprising one or more compounds as described above.

In such electrode active materials, in particular positive electrode active materials, the compounds according to the invention can optionally be combined with one or more other active compounds (that is to say, other than the compounds of the invention), such as conventional compounds, for example $LiCoO_2$, $LiNiO_2$, manganese oxides, in particular with the spinel structure $Li_{1+x}Mn_{2-x}O_4$ (with $0 \leq x \leq 0.33$), for example $LiMn_2O_4$, compounds of the family isotypic with olivine, such as $Li_{1-x}FePO_4$, for example $LiFePO_4$, compounds with the Nasicon structure, the insertion materials for lithium of the orthosilicate type disclosed in the document U.S. Pat. No. 6,085,015, and the materials disclosed in the document EP-A2-1 195 825.

The invention relates in addition to a positive electrode comprising the active material as described above.

In addition to the electrode active material proper, a positive electrode according to the invention generally comprises an electronic conductive material which is preferably carbon, in any form, such as carbon black, acetylene black, graphite or coke, and the like.

The positive electrode additionally comprises a polymer binder.

Said polymer binder is generally chosen from fluoropolymers, elastomers and cellulose compounds.

The fluoropolymer can be chosen, for example, from polymers and copolymers of vinylidene fluoride and polymers and copolymers of tetrafluoroethylene.

The positive electrode generally comprises from 75 to 95% by weight of active material, from 2 to 15% by weight of conductive material and from 3 to 10% by weight of polymer binder.

To prepare the positive electrode, the electrode active material, the conductive material and the polymer binder dissolved in a solvent are mixed. The mixture is applied, for example by coating, on a substrate made of a conductive material, for example made of aluminium, generally in the form of a sheet, and the substrate on which the mixture has been applied is dried by heating, optionally under vacuum.

The invention relates in addition to a battery, such as a lithium battery, comprising said positive electrode.

Such a battery generally comprises, in addition to said positive electrode, a negative electrode, a separator and an electrolyte. The negative electrode can be made of a material generally chosen from lithium metal, lithium alloys or carbon. Preferably, the negative electrode is based on $Li_4Ti_5O_{12}$.

The separator is generally made of a microporous polymer, such as polypropylene, or, and the like.

Finally, the electrolyte comprises a solvent and a conductive salt; the solvent is generally chosen from ethylene carbonate, propylene carbonate, dimethyl carbonate, diethyl carbonate, ethyl methyl carbonate, γ-butyrolactone, sulfolane, di($C_{1-4}$)alkyl ethers of ethylene glycol or of polyethylene glycol, for example of diethylene glycol, triethylene glycol or tetraethylene glycol, and their mixtures.

A preferred solvent is a mixture of ethylene carbonate and of dimethyl carbonate.

The conductive salt is generally chosen from lithium hexafluorophosphate, $LiPF_6$, $LiAsF_6$, $LiBF_4$, trifluoromethanesulphonate, and their mixtures.

Finally, the invention relates to an electrochromic device comprising the compound according to the invention.

In such an electrochromic device, the compound or a material comprising the compound according to the invention is often in the form of a deposit on a substrate, for example on glass. The passage of current, that is to say the insertion/removal of lithium, modifies the optical properties of the material, for example the colour of the latter. It is thus possible to obtain a window with a colour which varies. Otherwise, the operation is identical to that of the battery.

The invention will now be described with reference to the following examples, given by way of illustration and without limitation.

EXAMPLE 1

In this example, according to the invention, the compound of formula $LiFePO_4$ is prepared.

The iron (III) nitrilotriacetic complex, recorded as FeNTA, is first of all synthesized by bringing to reflux, for 1 hour, an aqueous solution comprising 17 g of iron (III) sulphate, $Fe_2(SO_4)_3$, and 8 g of nitrilotriacetic acid, $N(CH_2CO_2H)_3$. The iron (III) salt, initially insoluble, completely dissolves at approximately 60° C. (P=1 atm). At reflux, the complex with a bright yellow colour begins to appear. On cooling, the complex precipitates at the bottom of the reactor. Washing with cold water makes it possible to free it from the various reaction byproducts. The powder is subsequently dried in an oven at 30° C. overnight.

5 g of the preceding iron (III) complex are subsequently introduced into a Parr® 4842 autoclave reactor with a 0.0256 mol·l⁻¹ lithium hydrogenphosphate, $Li_2HPO_4$, solution (800 ml).

The reactor is subsequently hermetically sealed. The reaction medium is then brought to 200° C. with stirring. The pressure in the autoclave is set by the steam (P/T state diagram of water) and reaches, at this set temperature, the value of 20 bar. After heating for 2 hours, stirring is halted and the mixture is slowly cooled, either by inertia of the reactor (cooling time: 12 hours) or "stepwise".

When the reactor has returned to ambient temperature and to atmospheric pressure, the reactor can be opened and the powder recovered. The powder is subsequently washed with deionized water and dried under vacuum at 60° C.

The X-ray diffraction diagram performed on the powder resulting from this synthesis shows, whatever the method of cooling used, linear by inertia or stepwise, an absence of subsidiary peaks. Specifically, all the lines can be indexed in the orthorhombic system of triphylite, $LiFePO_4$.

The physicochemical analyses, namely the redox titration and the elemental analysis, and the morphological analyses, namely scanning electron microscopy SEM and particle sizing, of the synthesized material make it possible to establish that it is pure $LiFePO_4$.

This is because less than 1% of iron (III) is found with regard to all the iron present in the sample.

Figure 2:
FIG. 2 is a microphotograph, produced using a scanning electron microscope (SEM), of $LiFePO_4$ particles prepared by the process according to the invention (Example 1) with linear cooling, by inertia of the reactor, of the reaction mixture. The line shown represents 20 µm.

If the reactor is cooled by inertia from 220° C. to ambient temperature over 12 hours, the product obtained is present in the form of cylinders with a mean diameter of 20 μm and with a mean length of 15 μm (see FIG. 2).

Figure 3:
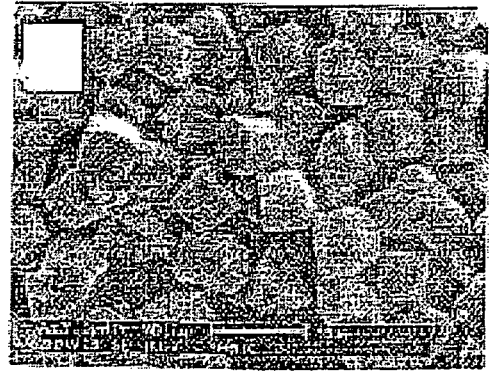
FIG. 3 is a microphotograph, produced using a scanning electron microscope (SEM), of $LiFePO_4$ particles prepared by the process according to the invention (Example 1) with stepwise cooling of the reaction mixture. The line shown represents 20 µm.

If cooling is carried out stepwise by lowering the temperature by 50° C. every 30 minutes, the product obtained is present in the form of cubes with a mean edge of 15 μm (see FIG. 3).

By way of comparison, $LiFePO_4$ prepared by the conventional all "solid" route, that is to say in which the solid precursors are heated at between 400° C. and 800° C. in the absence of any solvent, has an $Fe^{3+}$ content of greater than 5% and is composed of "non-homogeneous" particles which are not very homogeneous and which are agglomerated (see FIG. 1).

EXAMPLE 2

In this example, a battery is manufactured, the positive electrode of which comprises the compound according to the invention provided in Example 1.

a) Preparation of the Positive Electrode

The product obtained in Example 1 is mixed at 80% by weight with acetylene black (Super P, MMM Carbon, Belgium) (10%) and poly (vinylidene fluoride) (Solef 6020, Solvay, Belgium) (10%) dissolved in N-methylpyrrolidone. The mixture is subsequently coated onto a sheet of aluminium and then dried at 60° C. and then at 100° C. under vacuum.

b) Manufacture of the Battery

The positive electrode thus produced is introduced into a cell of format 2032 button battery type. The negative electrode is prepared in the same way but the active material is $Li_4Ti_5O_{12}$. The separator is composed of a film of microporous polypropylene (Celgard®, 3200 Aventis). The electrolyte used is composed of ethylene carbonate, of dimethyl carbonate and of lithium hexafluorophosphate ($LiPF_6$) (Electrolyte Selectipur LP30, Merck, Germany).

c) Test on the Battery

At 25° C., the battery thus formed operates between 3V and 1.0V and makes possible the reversible extraction/insertion of lithium corresponding to approximately 100 mAh/g of positive active compound at a rate of C/2 (charging or discharging in 2 hours). In other words, its specific capacity at C/2 is 100 mAh/g. By way of comparison, the same battery in which the positive electrode comprises $LiFePO_4$ prepared by the "all solid" synthesis route exhibits a specific capacity at c/2 of 100 mAh/g.

TABLE I

| Characteristics studied with regard to $LiFePO_4$ | All solid synthesis route | Process according to the invention (Example 1) |
|---|---|---|
| % $Fe^{3+}$ in the sample | >5% | <1% |
| Morphology | Non-homogeneous particles | Homogeneous particles |
| Specific capacity at C/2 | 50 mAh/g | 100 mAh/g |

The invention claimed is:

1. A process for the preparation of an insertion compound of an alkali metal comprising following steps:
   a) an organic complex of a transition metal or of a mixture of transition metals M in an oxidation state of greater than 2 is brought into contact with $Li_2HPO_4$ and with an entity of formula $H_b(XO_4)$, where X is chosen from the group consisting of Si, S, Al, P, Ge, As and Mo, and b has a value from 0 to 5, in a liquid medium in a closed chamber; the chamber is brought to a temperature T which makes possible the decomposition of the organic complex in said liquid medium; and
   b) the temperature and the pressure in the chamber are brought back to ambient temperature and atmospheric pressure and the insertion compound of an alkali metal of formula $LiMXO_4$, in which M is in the +2 oxidation state, is recovered,
   wherein the organic complex comprises the metal M bonded to an organic ligand chosen from compounds of the formula:

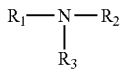

wherein at least one selected from the group consisting of $R_1$, $R_2$ and $R_3$ comprises at least one oxygen atom.

2. The process according to claim 1, in which the metal M in the organic complex is in an oxidation state of 3 to 5.

3. The process according to claim 2, in which the metal M in the organic complex is in an oxidation state of 3.

4. The process according to claim 1, in which X is P.

5. The process according to claim 1, in which, in the organic ligand, $R_1$, $R_2$ and $R_3$ are chosen independently from carboxy (1-4C) alkyl radicals.

6. The process according to claim 5, in which the organic ligand is nitrilotriacetic acid $N(CH_2CO_2H)_3$ or ethylenedioxyethylenedinitriletetraacetic acid (EGTA).

7. The process according to claim 5, in which, the carboxy (1-4C) alkyl radicals are carboxymethyl or carboxyethyl.

8. The process according to claim 1, in which the liquid medium in step a) is selected from the group consisting of water, organic solvents, and mixtures thereof.

9. The process according to claim 8, in which the organic solvents are liquid alkanes.

10. The process according to claim 9, in which the liquid alkanes are dodecane or tributyl phosphate (TBP).

11. The process according to claim 1, in which, on conclusion of step b), the compound is washed and then dried, optionally under vacuum.

12. The process according to claim 1, in which the organic complex is prepared in a step prior to step a) by bringing a salt of the metal M in the oxidation state greater than 2 into contact with an organic compound in the liquid medium of step a).

13. The process according to claim 12, in which, in the organic compound, $R_1$, $R_2$ and $R_3$ are chosen independently from carboxy (1-4C) alkyl radicals.

14. The process according to claim 13, in which the organic compound is nitrilotriacetic acid $N(CH_2CO_2H)_3$ or ethylenedioxyethylenedinitriletetraacetic acid.

15. The process according to claim 13, in which the carboxy (1-4C) alkyl radicals are carboxymethyl or carboxyethyl.

16. The process according to claim 12, in which the salt of the metal M is chosen from the group consisting of nitrates, sulphates, chlorides, acetates, citrates and carboxylates of the metal M.

17. The process according to claim 12, in which the liquid medium is selected from the group consisting of water, organic solvents, and mixtures thereof.

18. The process according to claim 17, in which the organic solvents are liquid alkanes.

19. The process according to claim 18, in which the liquid alkanes are dodecane or tributyl phosphate (TBP).

20. The process according to claim 1, in which the metal M is Mn, Fe, Ni, Co, or a mixture thereof.

* * * * *